United States Patent [19]
Cheng

[11] Patent Number: 5,586,775
[45] Date of Patent: Dec. 24, 1996

[54] FOLDABLE APPARATUS OF A BAGGAGE CART

[76] Inventor: Chin-chang Cheng, No. 20, Lane 327, Sec. 2, Chung Shan Rd., Chung Ho City, Taipei Hsien, Taiwan

[21] Appl. No.: 502,577

[22] Filed: Jul. 14, 1995

[51] Int. Cl.$^6$ ........................................................ B62B 1/12
[52] U.S. Cl. ................ 280/38; 280/43.24; 280/47.18; 280/47.131
[58] Field of Search ................ 280/38, 37, 652, 280/645, 646, 43.24, 47.131, 47.18, 47.25, 47.26

[56] References Cited

U.S. PATENT DOCUMENTS

| | | | |
|---|---|---|---|
| 3,057,636 | 10/1962 | D'Ettorre et al. | 280/37 |
| 3,865,392 | 2/1975 | Hartway | 280/47.131 |

FOREIGN PATENT DOCUMENTS

| | | | |
|---|---|---|---|
| 90/06878 | 6/1990 | WIPO | 280/47.131 |

Primary Examiner—Richard M. Camby
Assistant Examiner—Frank Vanaman
Attorney, Agent, or Firm—Jones, Day, Reavis & Pogue

[57] ABSTRACT

A foldable apparatus of a baggage cart includes a base plate, two elongate sockets formed on the base plate substantially along two sides thereof. A first cutout, a second cutout, and a third cutout are defined in each elongate socket and are substantially in alignment with each other. A flange is projected from a wall of the first cutout. A channel is defined in the socket and in communication with the first cutout, the second cutout and the third cutout. A pivot is pivotally received in the channel and having two ends thereof extending outward from the channel, where one end is integrally formed as a substantially U-shaped bracket which has an upright branch connected to a curved portion connected to a inclined branch, while the other end is formed as an upright rod which has a wheel rotatably connected thereto. A recess is defined in a low portion of a wall of the second cutout, and being sized to be capable of receiving an end portion of the inclined branch of the U-shaped bracket. The foldable apparatus is operable to be in an extended mode for transportation, where the upright branch is retained in the first cutout by the first flange and the upright rod is retained in the third cutout by the second flange, or in a retracted mode for storage, where an end portion of the inclined branch is received in the recess.

4 Claims, 9 Drawing Sheets

FOLDABLE APPARATUS OF A BAGGAGE CART

BACKGROUND OF THE INVENTION

1. Field of the Invention

The present invention relates to a foldable apparatus of a baggage cart, and more particularly to one which utilizes a new structure for enabling the foldable apparatus to fold and extend easily and perfectly.

2. Description of the Prior Art

Baggage construction used at the present time usually includes a baggage cart attached at a bottom thereof for ease of transportation. The baggage cart is equipped with wheels. These wheels occupy space when the baggage article is in storage. Moreover, the baggage article is apt to move due to these wheels when a user requires the baggage article to be positioned in place. Therefore, there are foldable baggage carts in which the wheels are allowed to retract. One of the conventional foldable baggage cart is illustrated in FIG. 10, which is attached at a bottom of an article of baggage 40 which is now shown in an empty status. The conventional baggage cart includes a base plate 41 made of metal or hard plastic, which has two elongate protrusions 42 formed near two sides thereof. Each elongate protrusion 42 defines a channel (not shown) therein for receiving a pivot 50. Each pivot 50 has two ends thereof extended outward from the channel and one end of the pivot 50 is integrally formed as a substantially U-shaped bracket 53 which has one branch 53' near the pivot 50 yet spaced from the pivot 50, while the other end of the pivot 50 is integrally formed as a post 52 to which a wheel 51 is rotatably connected. At two ends of the elongate protrusion 42 there is respectively formed an upright plate stop 43 which has a concave portion at substantially a center line thereof. When in operation, the branch 53' and the post 52 each has a portion respectively received in the concave portion of a corresponding upright plate stop 43. The branch 53' and the post 52 are retained in each corresponding upright plate stop 43 due to a self-deformation elastic force of the U-shaped bracket 53. When in storage, the pivot 50 is manually turned for substantially ninety degrees, therefore the bracket 53, the post 52, and the wheel 51 are in contact with the base plate 41 as shown in FIG. 10. However, this deformation elastic force in the U-shaped bracket 53 should be limited, otherwise the bracket 53 and the wheel 51 can not be retracted from the operation status to storage status easily. However, there are drawbacks in this foldable baggage cart. Firstly, the weight of the wheel 51 might cause the pivot 50 to turn in the channel defined in the elongate protrusion 42 when a user carries the baggage article while walking upstairs. Therefore, this foldable baggage cart might accidentally change from a storage status to an operation status thus causing inconvenience to the user. Secondly, the pivot 50 might turn in the channel defined in the elongate protrusion 42 due to a very heavy load in the baggage and especially when the baggage cart moves on a rugged surface. This is because the engagements between the upright plate stop 43 and the branch 53' of the bracket 53 and between the upright plate stop 43 and the post 52 are too weak to retain the baggage cart in operation status. Therefore, it is necessary to provide new structure for a baggage cart to mitigate and/or obviate the drawbacks of the conventional foldable baggage cart.

SUMMARY OF THE INVENTION

It is therefore an objective of the present invention to provide a new and improved foldable apparatus of a baggage cart which is easily operated between an extended mode for transporting the baggage and a retracted mode for storage and may be retained in the extended mode regardless of rugged surface when it is moved thereon.

It is one aspect of this invention to provide a foldable apparatus of a baggage cart. The foldable apparatus of a baggage cart includes a base plate, two elongate sockets formed on the base plate substantially along two sides thereof. A first cutout, a second cutout, and a third cutout are defined in each of the elongate sockets and substantially in alignment with each other. A first flange is projected from a wall of the first cutout. A channel is defined in the socket and in communication with the first cutout, the second cutout and the third cutout. A pivot is pivotally received in the channel and having a first end and a second end thereof extended outward from the channel. The first end of the pivot is integrally formed as a substantially U-shaped bracket which has an upright branch connected to a curved portion connected to a inclined branch which abuts against a wall of the second cutout by a resilience thereof, while a second end of the pivot is formed as an upright rod which has a wheel rotatably connected thereto. A recess is defined in a low portion of the wall of the second cutout,-and being sized to be capable of receiving an end portion of the inclined branch of the U-shaped bracket. Whereby the foldable apparatus is operable to be in an extended mode in which the upright branch and the upright rod are substantially perpendicular to the base plane and are respectively retained in the first cutout and the third cutout by the resilience of the inclined branch and the first flange, or to a retracted mode in which the upright branch and the upright rod are substantially in contact with the base plane and an end portion of the inclined branch is received in the recess.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
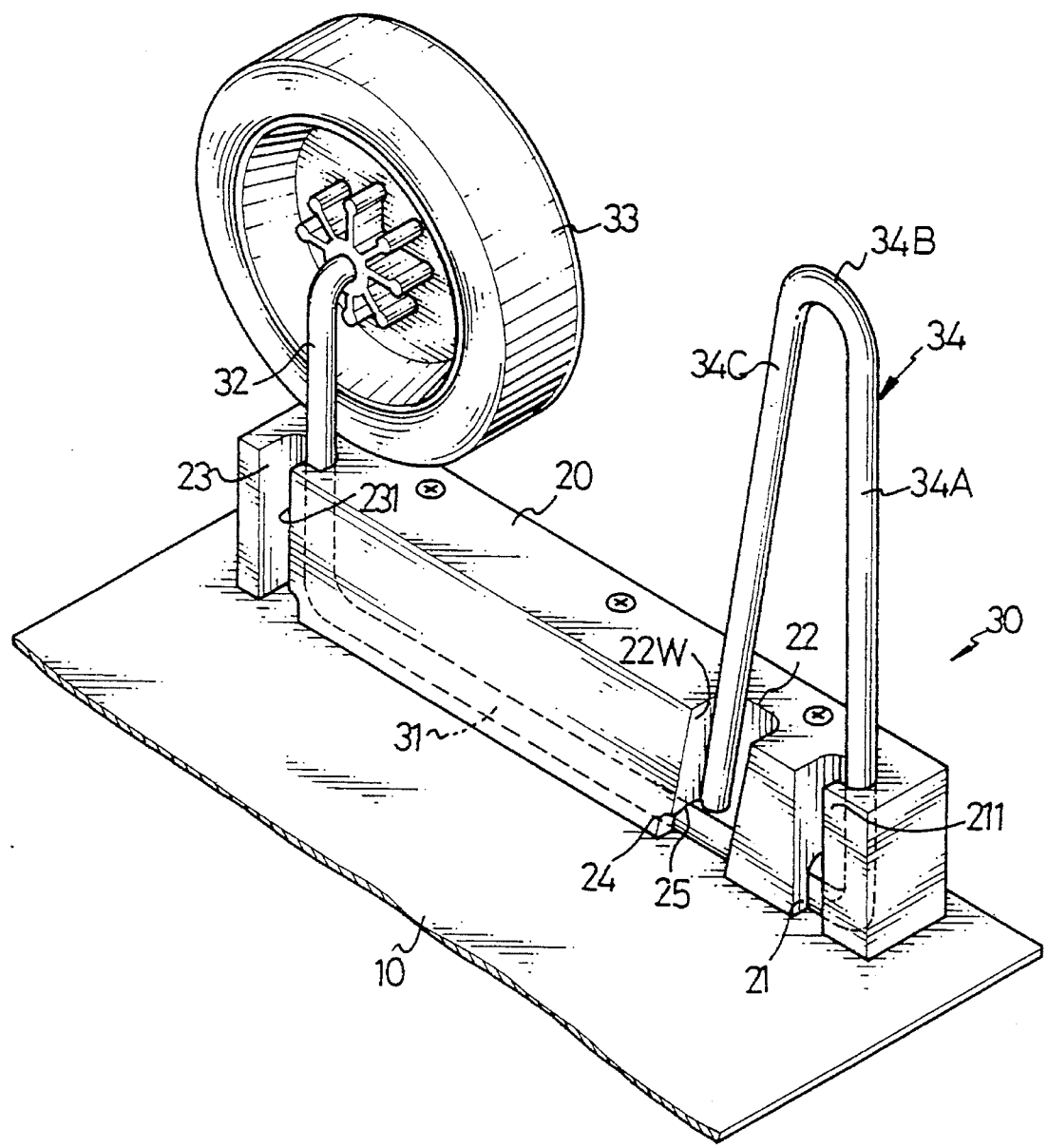
FIG. 1 illustrates a foldable apparatus of a baggage cart in accordance with the present invention used in an extended mode, where a bracket and a wheel thereof are extended from a base plate of the baggage cart.
Figure 3:
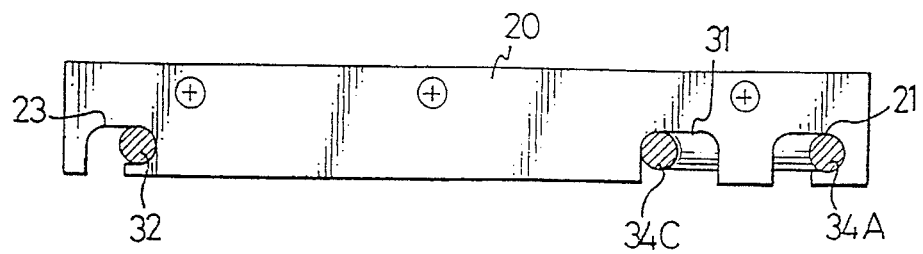
FIG. 3 is a partial cross-sectional view taken from lines 3—3 of FIG. 2.
Figure 7:
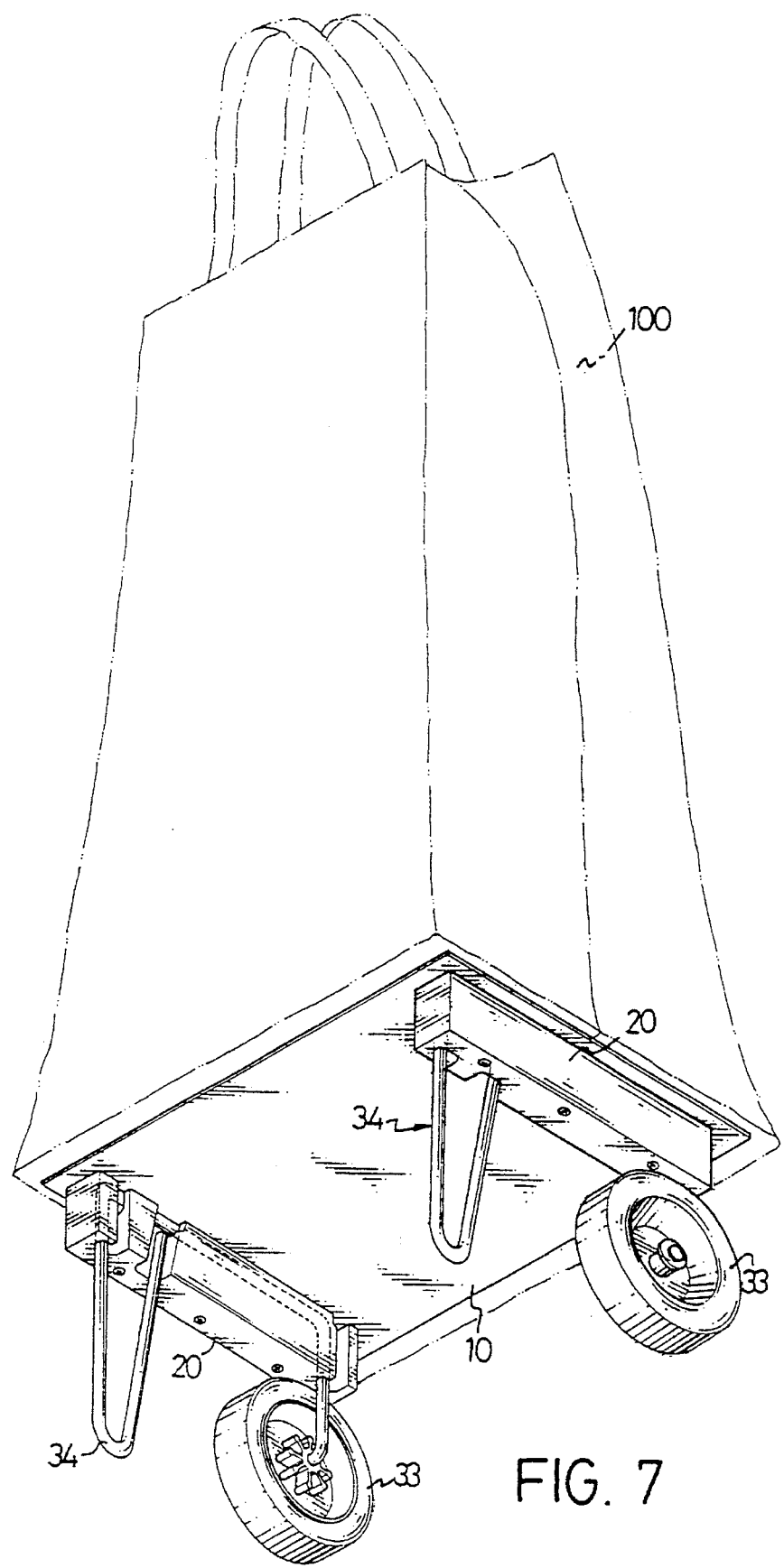
FIG. 7 illustrates the foldable apparatus of a baggage cart of the present invention being attached to a bottom of an article of a baggage.

Referring to FIG. 7, a foldable apparatus of a baggage cart comprises a base plate 10, two elongate sockets 20 each formed on the base plate 10 substantially along two sides thereof, a wheel 33 and a U-shaped bracket 34 being formed in each of the two elongate sockets 20. Also referring to FIG. 1, the foldable apparatus is described in more detail. FIG. 1 only illustrates half of the base plate 10, one of the elongate sockets 20, one of the wheels 33, and one of the U-shaped brackets 34. A first cutout 21, a second cutout 22, and a third cutout 23 are defined in the elongate socket 20 substantially in alignment with each other. A recess 24 is defined in a lower portion of a wall of the second cutout 22, and is sized to be capable of receiving an end portion of the 28 inclined branch 34C of the U-shaped bracket 34 as will be described later. The first cutout 21 and the third cutout 23 are L-shaped from a top view, i.e., a flange 211 and a flange 231 are respectively formed to further define the corresponding L-shaped cutouts 21 and 23. A channel 25 is defined in the socket 20 and is in communication with the first cutout 21, the second cutout 22 and the third cutout 23. A pivot 31 is pivotally received in the channel 25 and is rotatable therein. Each pivot 31 has two ends thereof extended outward from the channel 25 and one end of the pivot 31 is integrally formed as a substantially U-shaped bracket 34 while the other end of the pivot 31 is formed as an upright rod 32. The bracket 34 has an upright branch 34A retained in the first cutout 21, an inclined branch 34C retained in the second cutout 22, and a curved portion 34B integrally formed between the two branches 34A and 34C. It should be noted that the second cutout 22 is inclined for mating with the inclined branch 34C of the U-shaped bracket 34. The curved portion 34B is spaced with respect to the elongate socket 20 for abutting against a ground surface or the like preventing the cart from being moved when the cart is required to stay in place. The upright rod 32 has one end thereof being bent for pivotally connecting to a corresponding one of the wheels 33. The inclined branch 34C has a resilience to make it abut against a inclined wall 22W of the second cutout 22. The foldable apparatus of the present invention as shown in FIG. 1 is in an extended mode, i.e., the upright branch 34A of the U-shaped branch 34 and the upright rod 32 are substantially perpendicular to the base plate 10, therefore, the baggage cart is allowed to be pulled with the wheels 33 (see FIG. 7). It should be noted that when the foldable apparatus is in the extended mode, the pivot 31 is not rotatable in the channel 25 because the resilience of the inclined branch 34C of the U-shaped bracket 34 abuts it against the inclined wall 22W of the second cutout 22, therefore, the upright branch 34A is retained in the first cutout 21 by the flange 211 and the upright rod 32 is retained in the third cutout 23 by the flange 231.

Figure 2:
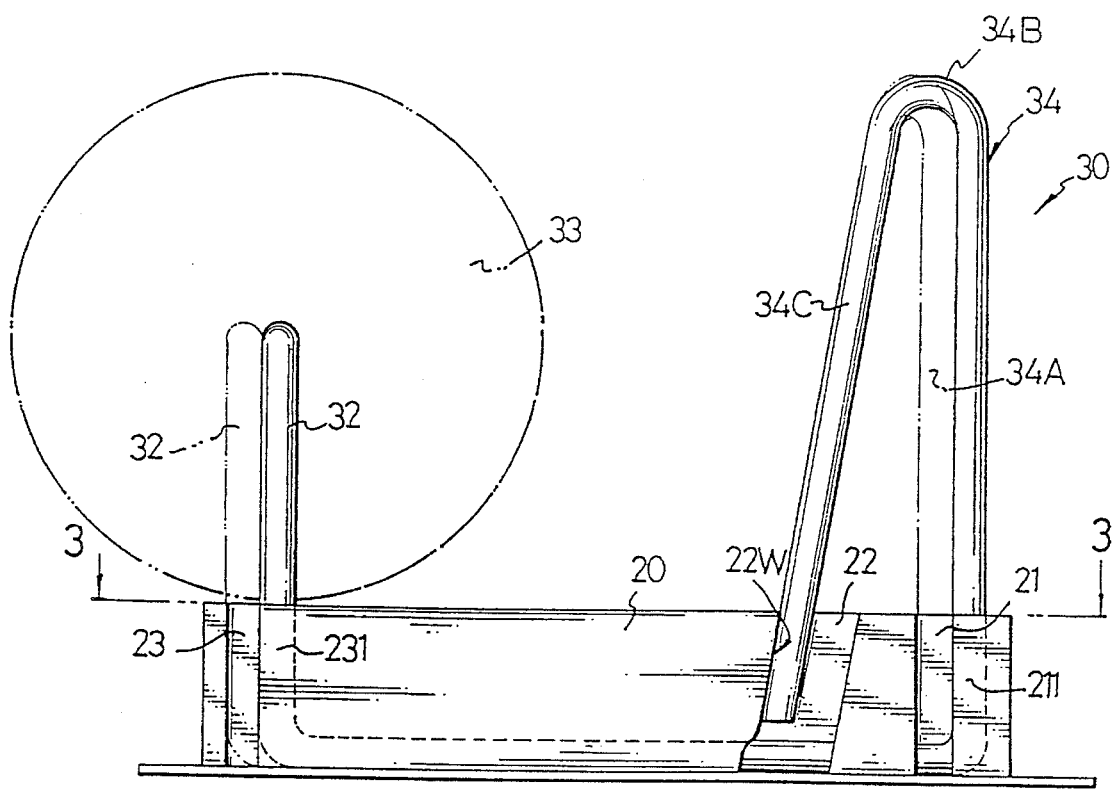
FIG. 2 is a side view of the foldable apparatus of FIG. 1.
Figure 4:
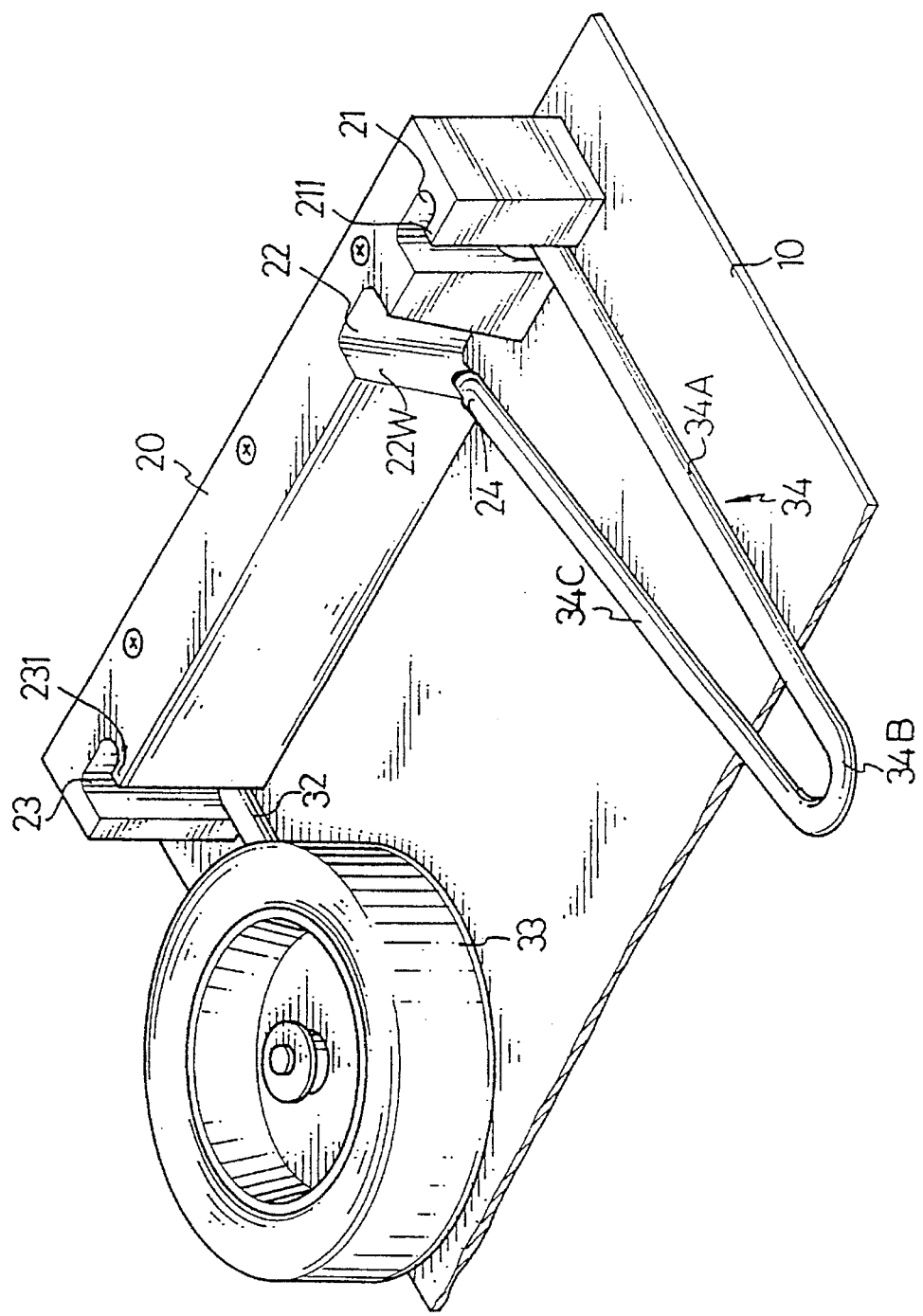
FIG. 4 illustrates the foldable apparatus used in a retracted mode, where a bracket and a wheel thereof are retracted to be substantially in contact with the base plate.
Figure 5:
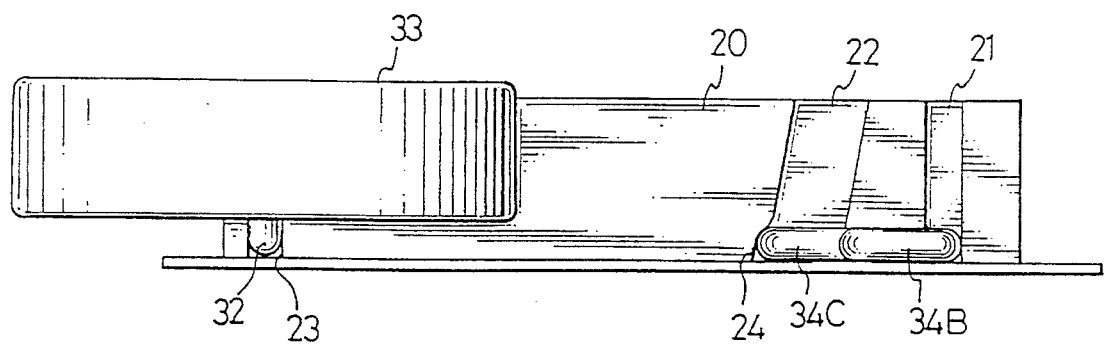
FIG. 5 is a side view of the foldable apparatus of FIG. 4.

The foldable apparatus of the present invention can be changed from the extended mode of FIG. 1 to a retracted mode as shown in FIG. 4. Referring to FIGS. 1 and 2, a user can hold the U-shaped bracket 34 and push it in a direction to where the wheel 33 is located, thus the upright branch 34A of the U-shaped bracket 34 is moved out of the limitation of the flange 211 and the upright rod 32 is moved out of the limitation of the flange 231 as shown in the phantom lines of FIG. 2, meanwhile the user can turn the U-shaped bracket 34 for substantially 90 degrees, thereby retracting the wheel 33 and the bracket 34 to be in contact with the bottom of the base plate 10 as shown in FIG. 4. An end portion of the inclined branch 34C of the U-shaped bracket 34 is received in the recess 24, and thereby the U-shaped bracket 34 and the upright rod 32' are retained in contact with the base plate 10, i.e., the foldable apparatus is retained in the retracted mode. FIG. 5 is a side view of FIG. 4, illustrating that an end portion of the inclined branch 34C is received in the recess 24, the U-shaped bracket 34 and the upright rod 32 are in contact with the base plate 10, and the wheel 33 is very close to the base plate 10. It should be noted that the second flange 231 can be omitted for reducing manufacturing cost. The resilience of the inclined branch 34C and the first flange 211 is enough to retain the upright branch 34A of the U-shaped branch 34 and the upright rod 32 to be perpendicular to the base plate 10 when the foldable apparatus is required to be retained in the extended mode.

Figure 6:
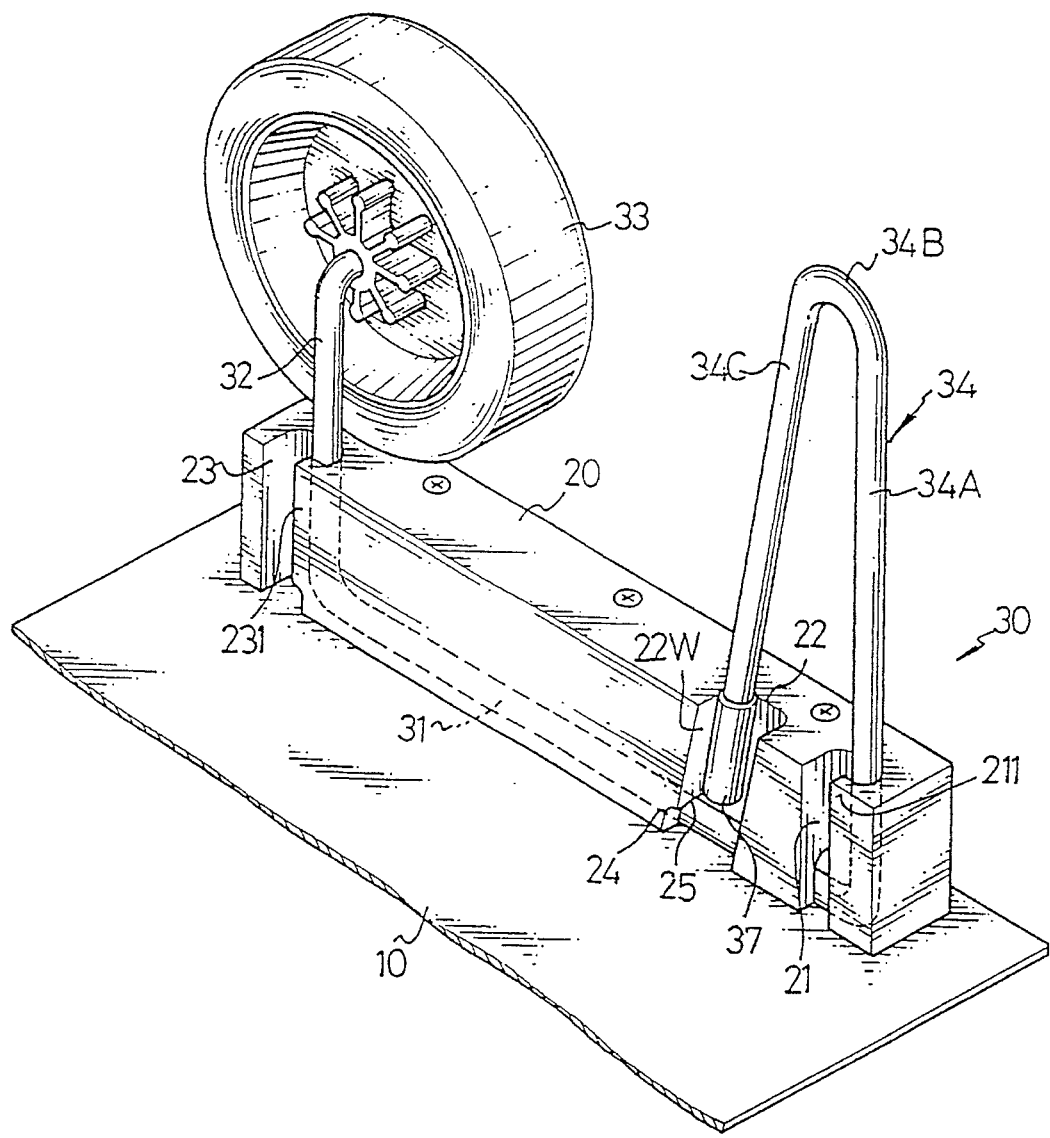
FIG. 6 is a second embodiment of a foldable apparatus of a baggage cart in accordance with the present invention.

FIG. 6 illustrates a second embodiment of a foldable apparatus of the present invention, where a lubricating sleeve 37 is fitted around an end portion of the inclined branch 34C of the U-shaped bracket 34 for ease if sliding the inclined branch 34C on the wall of the second cutout 22. Other structures of the second embodiment of the foldable apparatus are identical to those in the first embodiment thus the description thereof is omitted.

Figure 8:
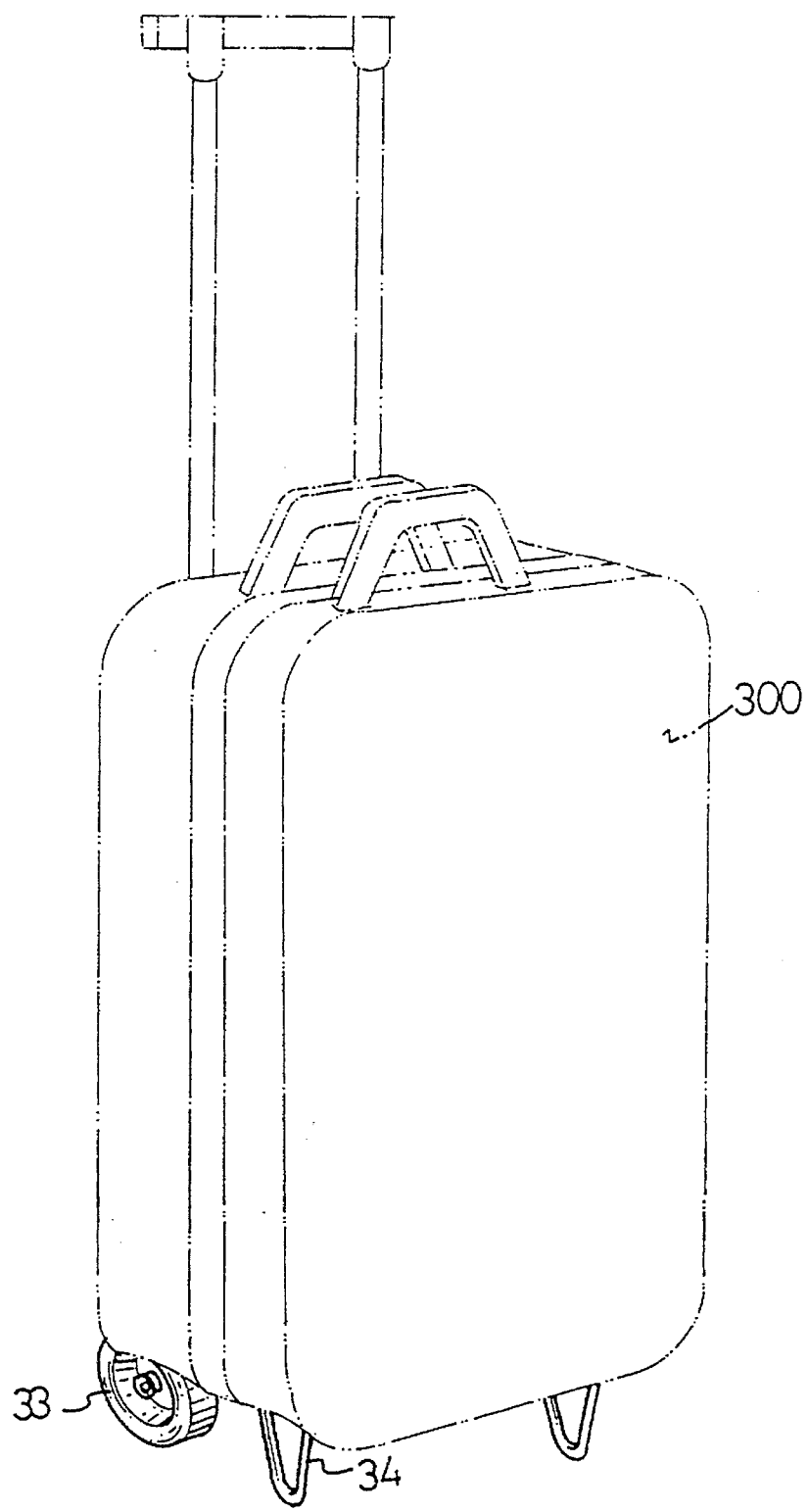
FIG. 8 illustrates the foldable apparatus of a baggage cart being attached to a bottom of a suitcase.
Figure 9:
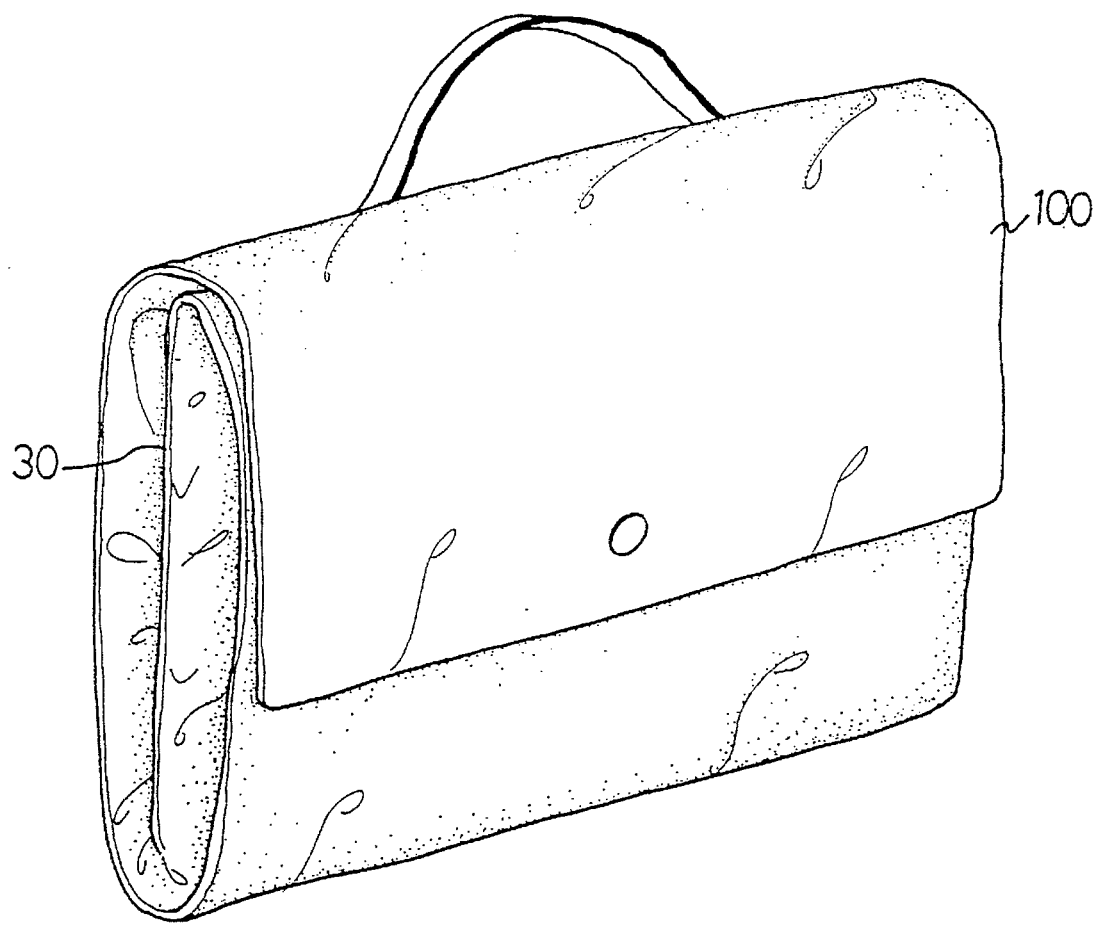
FIG. 9 illustrates that the foldable apparatus of the present invention is folded into a retracted mode and is enclosed in a bag.
Figure 10:
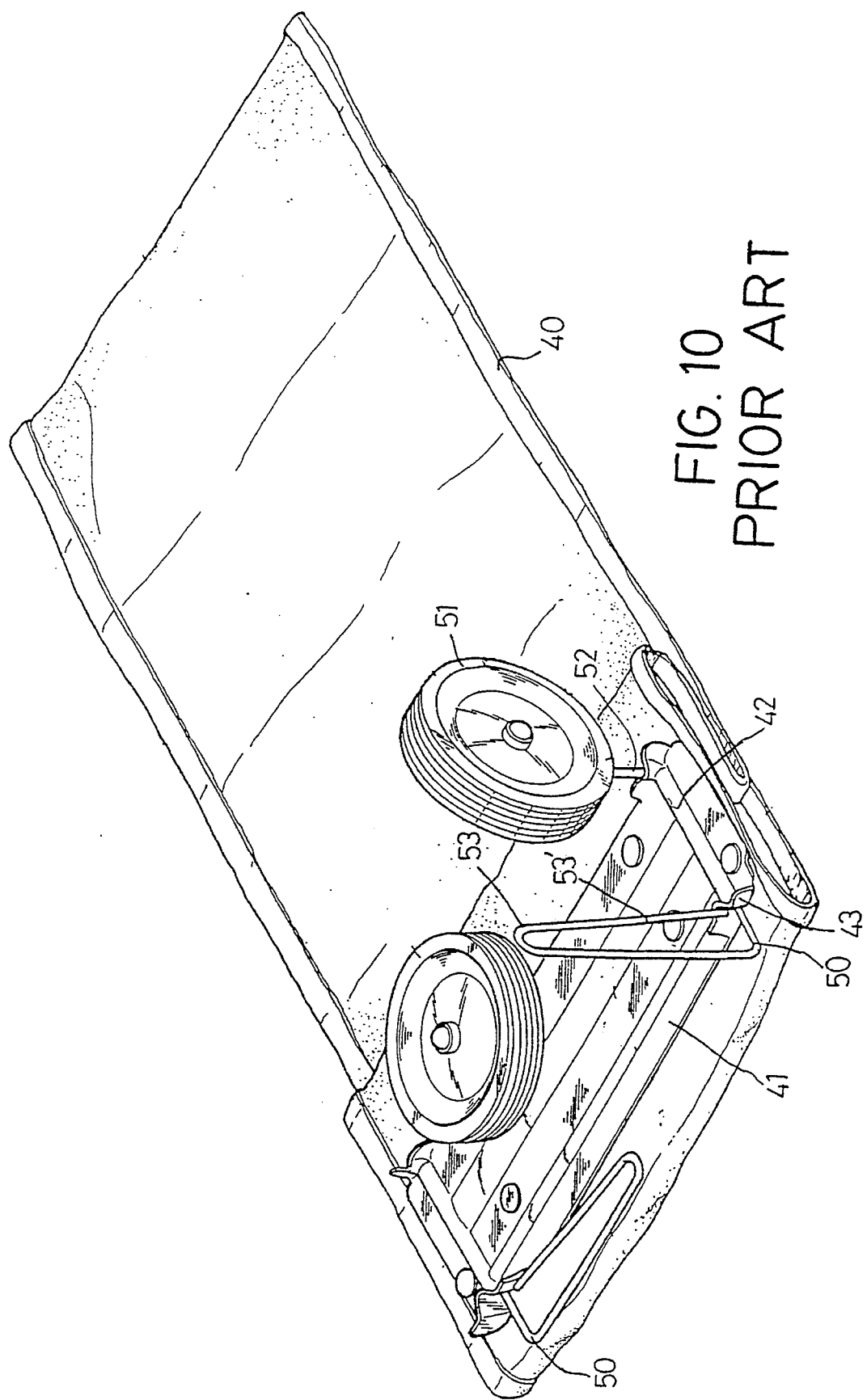
FIG. 10 is a conventional foldable apparatus of a baggage cart.

FIG. 7 illustrates that the foldable apparatus of a baggage cart is attached to an article of a baggage. FIG. 8 illustrates the foldable apparatus of a baggage cart is attached to a suitcase. FIG. 9 illustrates that the foldable apparatus can be folded into retracted mode and can be enclosed in the baggage 100 for easy transportation.

I claim:

1. A foldable apparatus of a baggage cart comprising a base plate (10), two elongate sockets (20) formed on the base plate (10) substantially along two sides thereof;

a first cutout (21), a second cutout (22), and a third cutout (23) being defined in the elongate socket (20) and substantially in alignment with each other;

a first flange (211) being projected from a wall of the first cutout (21);

a channel (25) is defined in the socket (20) and in communication with the first cutout (21), the second cutout (22) and the third cutout (23);

a pivot (31) being pivotally received in the channel (25) and having a first end and a second end of said pivot extended outward from the channel (25), the first end of the pivot (31) being integrally formed as a substantially U-shaped bracket (34) which has an upright branch (34A) integrally formed with a curved portion (34B) connected to a inclined branch (34C) which abuts against a wall (22W) of the second cutout (22) by a resilience of said inclined branch, while a second end of the pivot (31) is formed as an upright rod (32) which has a wheel (33) rotatably connected to said upright rod;

a recess (24) being defined in a low portion of the wall (22W) of the second cutout (22), and being sized to be capable of receiving an end portion of the inclined branch (34C) of the U-shaped bracket (34);

whereby the foldable apparatus is operable to be in an extended mode in which the upright branch (34A) and the upright rod (32) are substantially perpendicular to the base plate (10) and are respectively retained in the first cutout (21) and the third cutout (23) by the resilience of the inclined branch (34C) and the first flange (211), or to a retracted mode in which the upright branch (34A) and the upright rod (32) are substantially in contact with the base plate (10) and an end portion of the inclined branch (34C) is received in the recess (24).

2. A foldable apparatus of a baggage cart as claimed in claim 1 further comprising second flange (231) projected from a wall of the third cutout (23) to further limit a lower portion of the upright rod (32) retained in the third cutout (23) when the foldable apparatus is in the extended mode.

3. A foldable apparatus of a baggage cart as claimed in claim 1, wherein the Wall (22W) of the second cutout (22) is a inclined wall substantially mating with the inclined branch (34C) of the U-shaped bracket (34).

4. A foldable apparatus of a baggage cart as claimed in claim 1 further comprising a lubricating sleeve (37) fitted around an end portion of the inclined branch (34C) of the U-shaped bracket (34) for ease of the inclined branch (34C) sliding on the wall of the second cutout (22) when the foldable apparatus is operated to change between the extended mode and the retracted mode.

\* \* \* \* \*